(12) United States Patent
Zhang et al.

(10) Patent No.: US 11,226,697 B2
(45) Date of Patent: Jan. 18, 2022

(54) TOUCH SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Guiyu Zhang, Beijing (CN); Hongqiang Luo, Beijing (CN); KwangGyun Jang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/916,255

(22) Filed: Jun. 30, 2020

(65) Prior Publication Data
US 2021/0064171 A1 Mar. 4, 2021

(30) Foreign Application Priority Data
Sep. 4, 2019 (CN) .......................... 201910833311.9

(51) Int. Cl.
*G06F 3/041* (2006.01)
*G06K 9/00* (2006.01)
*G06F 3/044* (2006.01)

(52) U.S. Cl.
CPC ......... *G06F 3/0412* (2013.01); *G06K 9/0004* (2013.01); *G06K 9/00087* (2013.01); *G06F 3/044* (2013.01); *G06K 9/0002* (2013.01)

(58) Field of Classification Search
CPC ............ G06K 9/00087; G06K 9/0002; G06K 9/0004; G06F 3/044; G06F 3/0412
See application file for complete search history.

(56) References Cited

U.S. PATENT DOCUMENTS

| 2008/0264699 | A1* | 10/2008 | Chang | G06F 3/0446 178/18.01 |
|---|---|---|---|---|
| 2020/0074136 | A1* | 3/2020 | Shi | G06K 9/0004 |
| 2020/0082142 | A1* | 3/2020 | Ye | H01L 51/5253 |
| 2021/0089636 | A1* | 3/2021 | Lee | H04M 1/725 |

* cited by examiner

*Primary Examiner* — Charles V Hicks
(74) *Attorney, Agent, or Firm* — Nath, Goldberg & Meyer; Joshua B. Goldberg

(57) ABSTRACT

A touch substrate and a display device are provided. The touch substrate includes: a substrate having a surface including a touch region and a fingerprint recognition region, the touch region and the fingerprint recognition region not overlapping with each other; and a plurality of touch units in the touch region and the fingerprint recognition region, respectively. Each of the touch units in the touch region includes a touch structure. Each of the touch units in the fingerprint recognition region includes a plurality of fingerprint recognition units. Each of the plurality of fingerprint recognition units includes a fingerprint recognition structure, and in a touch mode, each fingerprint recognition structure is multiplexed as a touch structure of each touch unit in the fingerprint recognition region.

19 Claims, 4 Drawing Sheets

TOUCH SUBSTRATE AND DISPLAY DEVICE

CROSS REFERENCE TO RELATED APPLICATIONS

This application claims the priority of Chinese patent application No. 201910833311.9 filed on Sep. 4, 2019, the content of which is incorporated herein in its entirety by reference.

TECHNICAL FIELD

The present disclosure relates to the field of display technologies, and particularly relates to a touch substrate and a display device.

BACKGROUND

With the continuous popularization of mobile payment, the security problem during the payment is increasingly concerned by merchants and users, Identity recognition is often required during the payment, and the traditional identity recognition mode of inputting a password and signing one's name cannot meet the requirement of quick mobile payment. At present, relatively quick identity recognition modes mainly include fingerprint recognition and face recognition. Compared with the face recognition, the fingerprint recognition is not easily interfered by an external environment, the recognition effect is stable, and thus, the fingerprint recognition has obvious advantages.

SUMMARY

Embodiments of the present disclosure provide a touch substrate and a display device.

An aspect of the present disclosure provides a touch substrate, including:

a substrate having a surface including a touch region and a fingerprint recognition region, wherein the touch region and the fingerprint recognition region do not overlap with each other; and a plurality of touch units in the touch region and the fingerprint recognition region, respectively; wherein each of the touch units in the touch region includes a touch structure;

each of the touch units in the fingerprint recognition region includes a plurality of fingerprint recognition units; and each of the plurality of fingerprint recognition units includes a fingerprint recognition structure, and in a touch mode, each fingerprint recognition structure is multiplexed as a touch structure of each touch unit in the fingerprint recognition region.

In an embodiment, the touch structure in the touch region includes: a pair of first electrodes, a pair of second electrodes, a first bridge, a first connector, and a first interlayer insulating layer; wherein the first electrodes in the pair are connected to each other by the first bridge, the second electrodes in the pair are connected to each other by the first connector, and the first bridge and the first connector are arranged to cross each other and are spaced apart from each other by the first interlayer insulating layer.

In an embodiment, the fingerprint recognition structure includes: a pair of third electrodes, a pair of fourth electrodes, a second bridge, a second connector, and a second interlayer insulating layer; wherein the third electrodes in the pair are connected to each other by the second bridge, the fourth electrodes in the pair are connected to each other by the second connector, and the second bridge and the second connector are arranged to cross each other and are spaced apart from each other by the second interlayer insulating layer.

In an embodiment, the first electrodes, the second electrodes, the third electrodes, the fourth electrodes, the first connector, and the second connector are in a same layer and include a same material;

the first bridge and the second bridge are in a same layer and include a same material; and the first interlayer insulating layer and the second interlayer insulating layer are in a same layer and include a same material.

In an embodiment, touch structures of the touch units in the touch region are arranged in an array, fingerprint recognition structures of the touch units in the fingerprint recognition region are arranged in an array;

the first electrodes of the touch structures in a same row are connected to a same first driving line, and the second electrodes of the touch structures in a same column are connected to a same sensing line; and the third electrodes of the fingerprint recognition structures in a same row are connected to a same second driving line, and the fourth electrodes of the fingerprint recognition structures in a same column are connected to a same read line.

In an embodiment, two second electrodes of each touch structure and the first connector connecting the two second electrodes to each other are a one-piece structure.

In an embodiment, two fourth electrodes of each fingerprint recognition structure and the second connector connecting the two fourth electrodes to each other are a one-piece structure.

In an embodiment, touch structures of the touch units in the touch region are arranged in an array, and fingerprint recognition structures of the touch units in the fingerprint recognition region are arranged in an array; wherein adjacent first electrodes of adjacent touch structures in a same row are a one-piece structure;

adjacent second electrodes of adjacent touch structures in a same column are a one-piece structure;

adjacent third electrodes of adjacent fingerprint recognition structures in a same row are a one-piece structure; and adjacent fourth electrodes of adjacent fingerprint recognition structures in a same column are a one-piece structure.

In an embodiment, a configuration and a shape of the fingerprint recognition structure are the same as a configuration and a shape of the touch structure in the touch region, and a size of the fingerprint recognition structure is smaller than a size of the touch structure in the touch region.

In an embodiment, the touch structure in the touch region includes a touch electrode, the fingerprint recognition structure includes a fingerprint recognition electrode, and the touch electrode in the touch region and the fingerprint recognition electrode in the fingerprint recognition region are in a same layer and include a same material.

In an embodiment, touch electrodes are arranged in an array, and fingerprint recognition electrodes are arranged in an array;

the touch electrodes in a same row are connected to a same first driving line, and the touch electrodes in a same column are connected to a same sensing line; and the fingerprint recognition electrodes in a same row are connected to a same second driving line, and the fingerprint recognition electrodes in a same column are connected to a same read line.

In an embodiment, the touch substrate further includes a driver including a fingerprint recognition driving chip and a touch driving chip; wherein the fingerprint recognition driving chip is connected to the plurality of fingerprint recognition units so as to control the plurality of fingerprint recognition units to implement a touch function and a fingerprint recognition function; and the touch driving chip is connected to the touch units in the touch region to control the touch units in the touch region to implement the touch function.

In an embodiment, the substrate is a flexible substrate.

In an embodiment, the touch region and the fingerprint recognition region are at two ends of the surface of the substrate, respectively.

In an embodiment, the fingerprint recognition region divides the touch region into two separate parts, or the touch region surrounds the fingerprint recognition region.

Another aspect of the present disclosure provides a display device, including the touch substrate according to any one of the foregoing embodiments.

In an embodiment, the display device further includes a display panel.

In an embodiment, the display panel is an organic light emitting diode (OLED) display panel.

In an embodiment, at least one of the fingerprint recognition structure and the touch structure of the touch substrate overlaps with a pixel of the display panel in a stacking direction of the touch substrate and the display panel.

In an embodiment, an orthographic projection of at least one of the fingerprint recognition structure and the touch structure of the touch substrate on the display panel is in a gap between adjacent pixels of the display panel.

DETAILED DESCRIPTION

To enable one of ordinary skill in the art to better understand technical solutions of the present disclosure, the present disclosure will be further described in detail below with reference to the accompanying drawings and exemplary embodiments.

The inventors of the present inventive concept have found that, in a related display device, the conventional implementation of the fingerprint recognition function depends on a certain module, and thus it is necessary to reserve an enough space in the display device for disposing the certain module. However, with the continuous development of display devices having a full-screen (i.e. a screen in which a ratio of an area of a display region to an area of a light exit surface is increased to be almost equal to 100%), the space reserved for a fingerprint recognition module in the display device has been extremely limited. In addition, the fingerprint recognition module has increased a thickness of the display device, which reduces a light transmittance and a display effect of the display device. Further, a manufacturing process for the fingerprint recognition module is complicated, and thus is unfavorable for ensuring the yields of the fingerprint recognition module and another product including the fingerprint recognition module.

Figure 1:
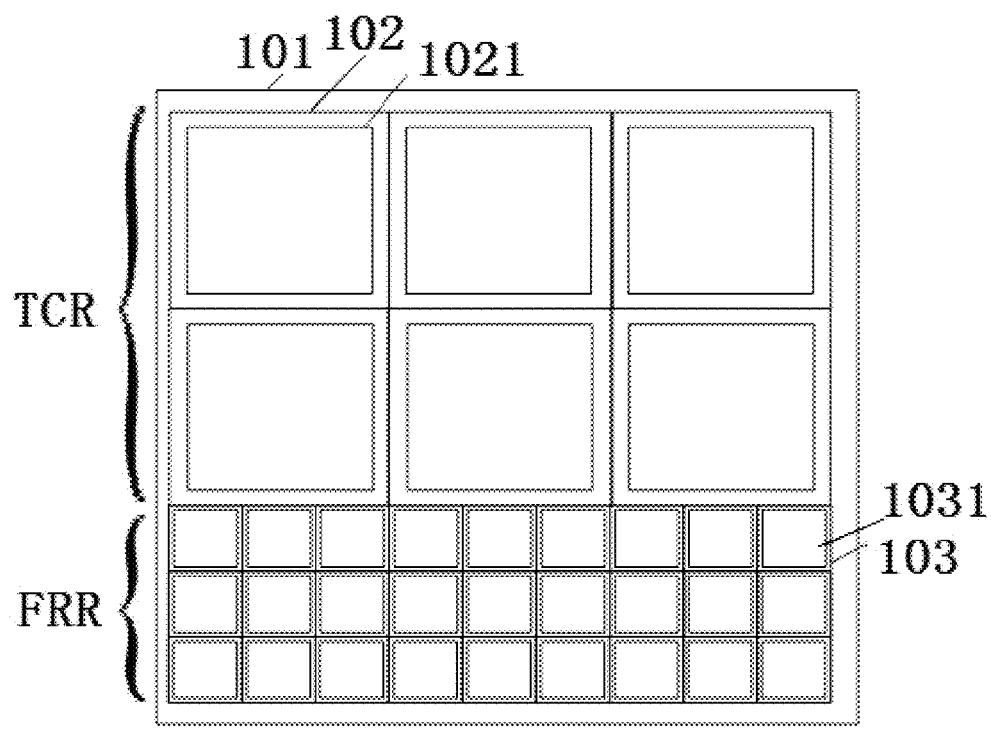
FIG. 1 is a schematic diagram showing a structure of a touch substrate according to an embodiment of the present disclosure.

FIG. 1 is a schematic diagram showing a structure of a touch substrate (which may also be referred to as a touch control substrate) according to an embodiment of the present disclosure. As shown in FIG. 1, the touch substrate includes a substrate 101 and a plurality of touch units 102 (as an example, FIG. 1 shows nine touch units 102 in total arranged in three rows and three columns) on the substrate 101. For example, a surface (e.g., the upper surface in FIG. 1) of the substrate 101 may include a touch region (which may also be referred to as a touch control region) TCR and a fingerprint recognition region FRR that do not overlap with each other, and the plurality of touch units 102 are located in the touch region TCR and the fingerprint recognition region FRR, respectively. In an embodiment, each touch unit 102 of at least a portion of the plurality of touch units 102 (e.g., three touch units 102 located in the third row that is in the fingerprint recognition region FRR as shown in FIG. 1) may include a plurality of fingerprint recognition units 103 (as an example, FIG. 1 shows that each touch unit 102 includes nine fingerprint recognition units 103). Each of the remaining touch units 102 (e.g., the six touch units 102 in total arranged in the first row and the second row in the touch region TCR as shown in FIG. 1) of the plurality of touch units 102 may include a touch structure 1021 for implementing a touch function. In another embodiment, each of the plurality of touch units 102 may include a plurality of fingerprint recognition units 103. Each of the fingerprint recognition units 103 may include a fingerprint recognition structure 1031 for implementing a fingerprint recognition function. And in a touch mode (or touch scene), the fingerprint recognition structures 1031 in each touch unit 102 are multiplexed as (or serve as) a touch structure 1021 in the touch unit 102 in the fingerprint recognition region FRR. Touch structures 1021 in the touch region TCR can realize the touch function, and the fingerprint recognition structures 1031 in the fingerprint recognition region FRR can realize both the fingerprint recognition function and the touch function.

Figure 5:
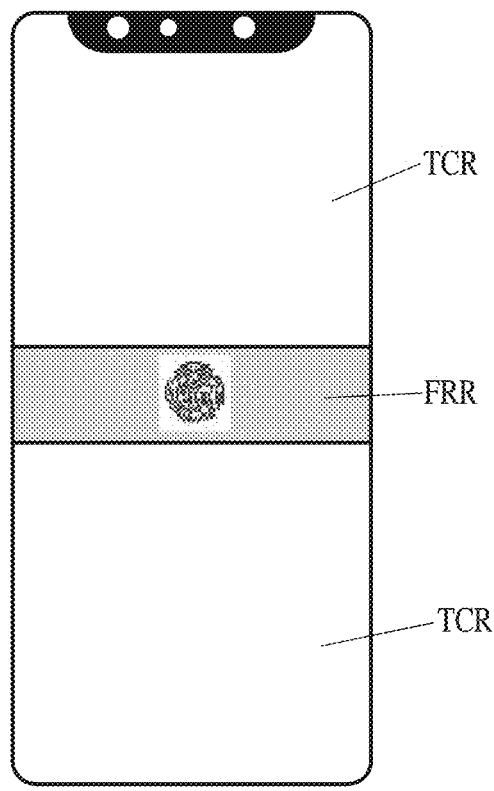
FIGS. 5 and 6 are schematic diagrams each showing positional relationships between a touch region and a fingerprint recognition region of a touch substrate according to an embodiment of the present disclosure.
Figure 6:
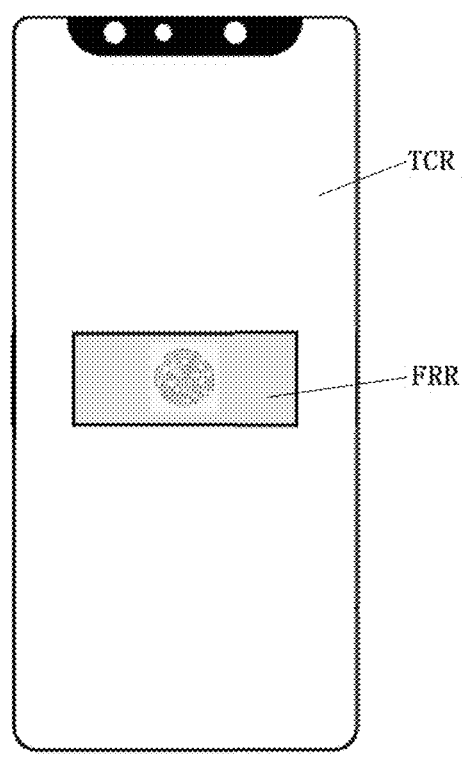

In the touch substrate provided by the present embodiment of present disclosure, a certain number of fingerprint recognition units 103 are arranged in each touch unit 102 of at least a portion of the touch units 102 located in the fingerprint recognition region FRR, and each fingerprint recognition unit 103 includes the fingerprint recognition structure 1031. In a fingerprint recognition mode (or fingerprint recognition scene), a fingerprint recognition driving signal may be input to each fingerprint recognition structure 1031 of each touch unit 102, and a change in charge of each fingerprint recognition structure 1031 (i.e., a change in capacitance of each fingerprint recognition structure 1031) is read. Next, a current fingerprint image is formed according to the change in capacitance of each fingerprint recognition structure 1031 and by using a preset algorithm (e.g., a known fingerprint recognition algorithm). Then, the current fingerprint image is compared with a preset (or pre-stored) fingerprint image in a database, thereby implementing the fingerprint recognition function. In the touch mode, a same touch driving signal is input to the fingerprint recognition structures 1031 in each touch unit 102 in the fingerprint recognition region FRR, and at this time, the fingerprint recognition structures 1031 in each touch unit 102 is equivalent to the touch structure 1021. Changes in charge (i.e., changes in capacitance) of the fingerprint recognition structures 1031 in the touch unit 102 may be read out, and a position where touch occurs may be determined according to the changes in capacitance of the fingerprint recognition structures 1031, thereby implementing the touch function. Therefore, the fingerprint recognition structures 1031 in the fingerprint recognition region FRR of the touch substrate provided by the present embodiment of the present disclosure may be multiplexed as serve as) the touch structures 1021, thereby, realizing integration of the touch function and the fingerprint recognition function. Further, the requirement on the accuracy of fingerprint recognition is high in the fingerprint recognition mode, such that a size of each fingerprint recognition structure 1031 is smaller than that of each touch structure 1021. Therefore, each touch unit 102 located in the fingerprint recognition region FRR may be divided into a plurality of sub-regions (e.g., each touch unit 102 located in the fingerprint recognition region FRR is divided into nine sub-regions as shown in FIG. 1) according to the accuracy of fingerprint recognition, and then one fingerprint recognition structure 1031 is arranged in each of the sub-regions, such that each touch unit 102 located in the fingerprint recognition region FRR includes a plurality of (e.g., nine) fingerprint recognition structures 1031, which can reduce the difficulty of the manufacturing process and improve the yield of products. Moreover, the fingerprint recognition units 103 may be disposed in any portion of the plurality of touch unit 102 according to the product design requirement of a display device, and may not be necessarily limited to be located at the bottom of the display device, which increases the feasibility and/or flexibility of the product design. In other words, although FIG. 1 shows that the touch region TCR is located at an upper portion of the upper surface of the substrate 101 and the fingerprint recognition region FRR is located at a lower portion of the upper surface of the substrate 101, the present disclosure is not limited thereto. For example, the touch region TCR may be located at the lower portion of the upper surface of the substrate 101 and the fingerprint recognition region FRR may be located at the upper portion of the upper surface of the substrate 101; the fingerprint recognition region FRR may divide the touch region TCR into two portions (as shown in FIG. 5); the touch region TCR may surround the fingerprint recognition region FRR such that the fingerprint recognition region FRR is completely located inside the touch region TCR (as shown in FIG. 6); or the like, as long as the touch region TCR and the fingerprint recognition region FRR do not overlap with each other. Therefore, a positional relationship between the touch region and the fingerprint recognition region of the touch substrate provided by an embodiment of the present disclosure may be flexibly set as required.

The touch substrate provided by the above embodiment of the present disclosure may be a mutual capacitance touch substrate or a self capacitance touch substrate. The touch substrate provided by the above embodiment of the present disclosure will be described in further detail below with reference to the accompanying drawings.

Figure 2A:
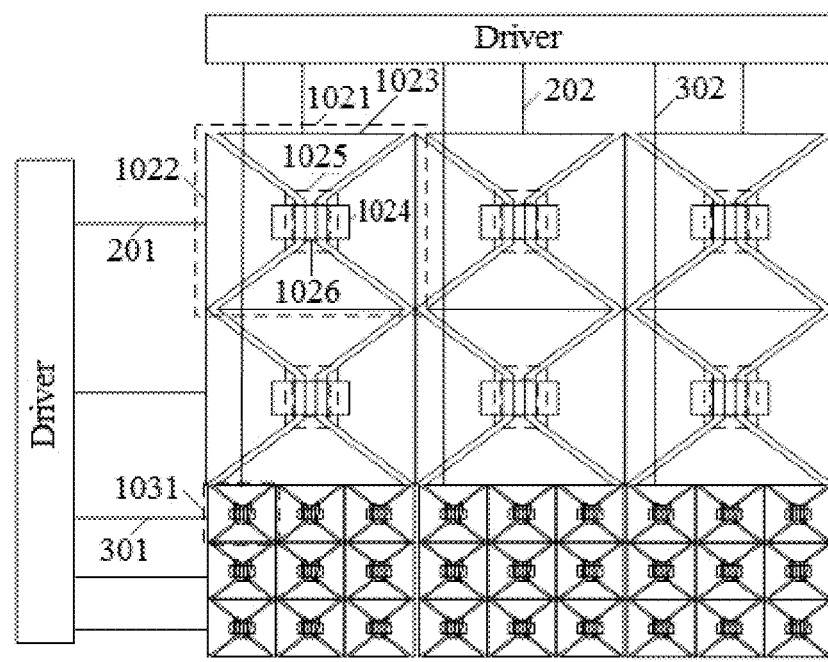
FIG. 2a is a schematic diagram showing a structure of a mutual capacitance touch substrate according to an embodiment of the present disclosure.

An embodiment of the present disclosure provides a first touch substrate, which may be a mutual capacitance touch substrate, for example. As shown in FIG. 2a, the touch structure 1021 of each touch unit 102 in the touch region TCR of the touch substrate includes: a pair of first electrodes 1022 and a pair of second electrodes 1023. For example, the first electrodes 1022 in the pair are connected to each other by a first bridge 1024, and the second electrodes 1023 in the pair are connected to each other by a first connector 1025. The first bridge 1024 and the first connector 1025 may be disposed to cross each other and may be spaced apart from each other by an interlayer insulating layer 1026 made of an insulating material (e.g., a transparent organic or inorganic insulating material), such that a light transmittance of the insulating material can be improved while the electrical insulation is satisfied.

In an embodiment, the pair of first electrodes 1022, the pair of second electrodes 1023, and the first connector 1025 of each touch structure 1021 are disposed in a same layer, and the first bridge 1024 and the first connector 1025 are insulated and spaced apart from each other by the interlayer insulating layer 1026 (in other words, the interlayer insulating layer 1026 is disposed between the first bridge 1024 and the first connector 1025). In this way, by detecting the change in capacitance between the opposite sides of each first electrode 1022 and each second electrode 1023, the touch function of the touch structure 1021 may be realized. Further, in the present embodiment, the first electrodes 1022 and the second electrodes 1023 are disposed in a same layer, such that a thickness of the touch substrate may be reduced. Alternatively, the first electrodes 1022 and the second electrodes 1023 may not be provided in a same layer, and for example, the second electrodes 1023 and the first bridge 1024 may be provided in a same layer.

Figure 2B:
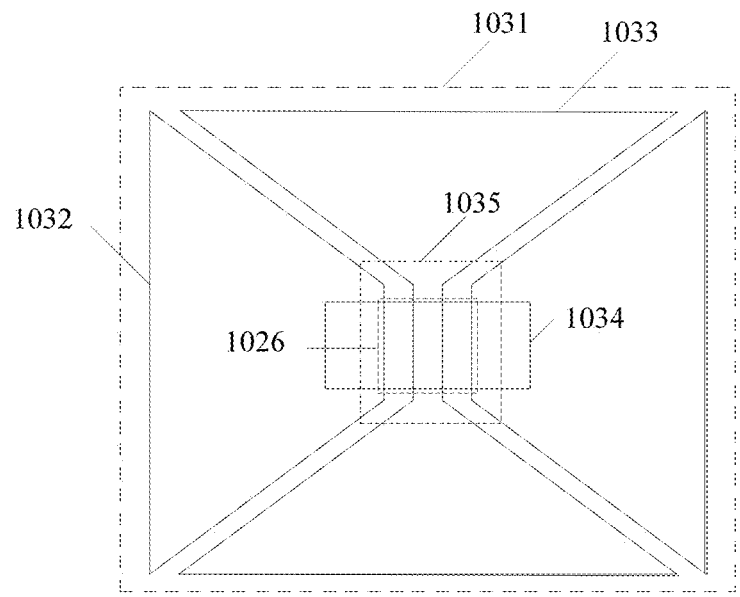
FIG. 2b is a schematic diagram showing a fingerprint recognition structure according to an embodiment of the present disclosure.

Since the size of each fingerprint recognition structure 1031 in FIG. 2a is too small compared with the size of each touch structure 1021, the structure of each fingerprint recognition structure 1031 cannot be clearly shown in FIG. 2a, and thus, each fingerprint recognition structure 1031 in FIG. 2a is separately illustrated in FIG. 2b. As shown in FIG. 2b, the fingerprint recognition structure 1031 of each fingerprint recognition unit 103 in the touch substrate includes: a pair of third electrodes 1032 and a pair of fourth electrodes 1033. For example, the third electrodes 1032 in the pair may be connected to each other by a second bridge 1034, and the fourth electrodes 1033 in the pair may be connected to each other by a second connector 1035. The second bridge 1034 and the second connector 1035 may be disposed to cross each other and be spaced apart from each other by the interlayer insulating layer 1026 (in other words, the interlayer insulating layer 1026 is disposed between the second bridge 1034 and the second connector 1035). In an embodiment, each of the first electrodes 1022, each of the second electrodes 1023, each of the third electrodes 1032, each of the fourth electrodes 1033, each of first connectors 1025, and each of second connectors 1035 are disposed in a same layer and made of a same material, and each of first bridges 1024 and each of second bridges 1034 are disposed in a same layer and made of a same material.

In an embodiment, the pair of third electrodes 1032, the pair of fourth electrodes 1033 and the second connector 1035 of each fingerprint recognition structure 1031 are disposed in a same layer, and the second bridge 1034 and the second connector 1035 may be insulated and spaced apart from each other by the interlayer insulating layer 1026. In this way, a capacitance may be formed between the opposite sides of each third electrode 1032 and each fourth electrode 1033. In the fingerprint recognition mode, a fingerprint recognition driving signal may be input to each of the third electrodes 1032 of each touch unit 102 in the fingerprint recognition region FRR, and a current fingerprint image may be formed according to a change in capacitance between the opposite sides of each third electrode 1032 and a corresponding fourth electrode 1033 and by using a preset algorithm (e.g., a known image recognition algorithm). Then, the current fingerprint image is compared with a preset (e.g., pre-stored) fingerprint image in a database, thereby implementing the fingerprint recognition function. In the touch mode, a same touch driving signal is input to the third electrodes 1032 of the touch units 103 in the fingerprint recognition region FRR, and at this time, the third electrodes 1032 and the fourth electrodes 1033 of each touch unit 102 in the fingerprint recognition region FRR are equivalent to one touch structure 1021 in the touch region TCR, and a position where touch occurs may be determined according to changes in capacitance between opposite sides of the third electrodes 1032 and the corresponding fourth electrodes 1033, thereby implementing the touch function. In addition, since each of the first electrodes 1022, each of the second electrodes 1023, each of the third electrodes 1032, each of the fourth electrodes 1033, each of the first connectors 1025, and each of the second connectors 1035 are disposed in a same layer and made of a same material, such that the touch substrate may be manufactured in one process, and the thickness of the touch substrate may be reduced, thereby reducing a thickness of a display device including the touch substrate.

As shown in FIG. 2a, the touch structures 1021 may be arranged in an array and the fingerprint recognition structures 1031 may be arranged in an array. For example, the first electrodes 1022 of the touch structures 1021 in a same row are connected to a same first driving line 201, and the second electrodes 1023 of the touch structures 1021 in a same column are connected to a same sensing line 202. The third electrodes 1032 of the fingerprint recognition structures 1031 in a same row are connected to a same second driving line 301, and the fourth electrodes 1033 of the fingerprint recognition structures 1031 in a same column are connected to a same read line 302.

It should be noted that, the first electrodes 1022 in a same row may be connected to a driver (or a driving chip, which may be implemented by an integrated circuit IC, for example) by a same first driving line 201, the second electrodes 1023 in a same column may be connected to the driver by a same sensing line 202, the third electrodes 1032 in a same row may be connected to the driver by a same second driving line 301, and the fourth electrodes 1033 in a same column may be connected to the driver by a same read line 302. In an embodiment of the present disclosure, the driver may include a touch driving chip and a fingerprint recognition driving chip, and the touch driving chip and the fingerprint recognition driving chip may be integrated into a same chip. According to different application scenes, the driver may output different driving signals to realize the touch function and the fingerprint recognition function. In the fingerprint recognition mode, a fingerprint recognition driving signal is input to the second driving line 301 connected to the third electrodes 1032 in a same row, and a change in capacitance between the opposite sides of the third electrodes 1032 and the fourth electrodes 1033 is read out through one read line 302 connected to the fourth electrodes 1033, a current fingerprint image is formed through a preset algorithm according to the change in capacitance between the opposite sides of the third electrodes 1032 and the fourth electrodes 1033. Then, the current fingerprint image is compared with a preset fingerprint image (i.e., a reference fingerprint image) in a database, thereby implementing the fingerprint recognition function. In the touch mode, a same touch driving signal is input to multiple second driving lines 301 connected to the third electrodes 1032 in multiple rows, and since the touch driving signal input to the multiple second driving lines 301 in the multiple rows is the same, the fingerprint recognition structures 1031 in each touch unit 102 are equivalent to one touch structure 1021 at this time. Changes in capacitance between the opposite sides of the third electrodes 1032 and the fourth electrodes 1033 are detected through multiple read lines 302 connected to the fourth electrodes 1033 in multiple columns, and a position where touch occurs may be determined according to the changes in capacitance between the opposite sides of the third electrodes 1032 and the fourth electrodes 1033, thereby implementing the touch function. As described above, the touch structures 1021 are distributed in an array, and the fingerprint recognition structures 1031 are also arranged in an array, such that the wiring difficulty of the touch substrate may be reduced.

As shown in FIG. 2a, the two second electrodes 1023 of each touch structure 1021 and the first connector 1025 connecting the two second electrodes 1023 to each other may be a one-piece structure and include a same material. As shown in FIG. 2h, the two fourth electrodes 1033 of each fingerprint recognition structure 1031 and the second connector 1035 connecting the two fourth electrodes 1033 to each other may be a one-piece structure and include a same material.

As shown in FIG. 2a, the touch structures 1021 are arranged in an array, and the fingerprint recognition structures 1031 are arranged in an array. For example, adjacent first electrodes 1022 of adjacent touch structures 1021 in a same row are a one-piece structure, and adjacent second electrodes 1023 of adjacent touch structures 1021 in a same column are a one-piece structure. Similarly, adjacent third electrodes 1032 of adjacent fingerprint recognition structures 1031 in a same row are a one-piece structure, and adjacent fourth electrodes 1033 of adjacent fingerprint recognition structures 1031 in a same column are a one-piece structure.

As described above, the adjacent first electrodes 1022 of the adjacent touch structures 1021 in a same row may be a one-piece structure, and the adjacent second electrodes 1023 of the adjacent touch structures 1021 in a same column may be a one-piece structure. In this way, in a manufacturing process, the first electrodes 1022 in one row may be formed by a one-step patterning process, and similarly, the second electrodes 1023 in one column may also be formed by a one-step patterning process, thereby reducing the difficulty of the process. The adjacent third electrodes 1032 of the adjacent fingerprint recognition structures 1031 in a same row may be a one-piece structure, and the adjacent fourth electrodes 1033 of the adjacent fingerprint recognition structures 1031 in a same column may be a one-piece structure. Thus, in the manufacturing process, the third electrodes 1032 in one row and the fourth electrodes 1033 in one column may be formed by a one-step patterning process, respectively, so as to reduce the difficulty of the process.

As shown in FIGS. 2a and 2b, a configuration and a shape of each fingerprint recognition structure 1031 may be the same as a configuration and a shape of each touch structure 1021, respectively, except that the overall size (e.g., area) of each fingerprint recognition structure 1031 is smaller than the overall size (e.g., area) of each touch structure 1021. For example, in the example of FIG. 2a, the overall size of each fingerprint recognition structure 1031 may be ⅑ of the overall size of each touch structure 1021. Therefore, the design difficulty and the manufacturing difficulty for the touch substrate are reduced.

Figure 3:
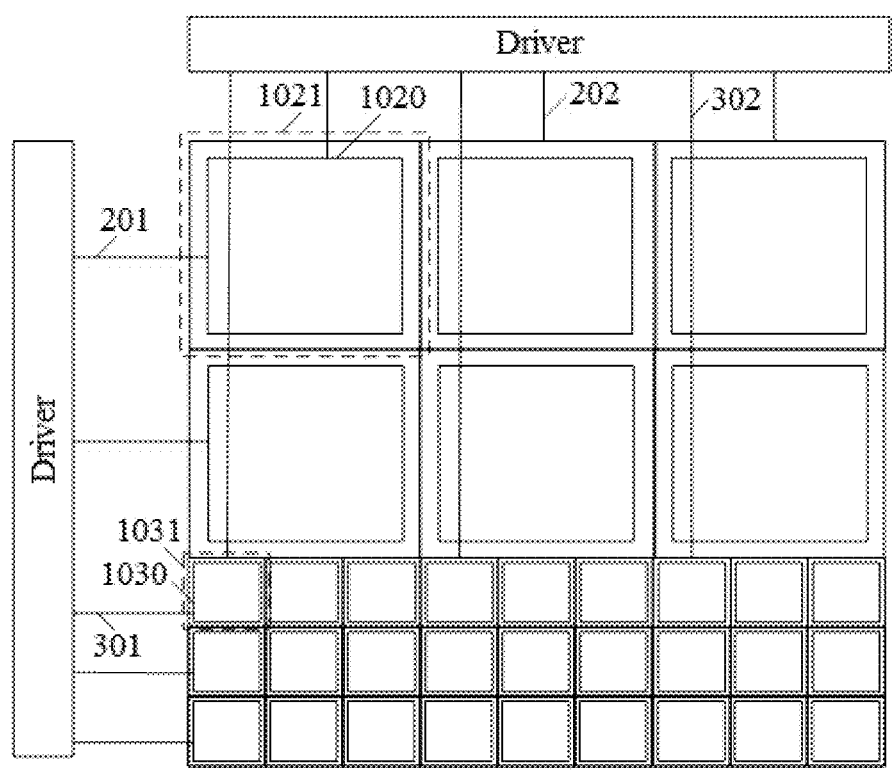
FIG. 3 is a schematic diagram showing a structure of a self capacitance touch substrate according to an embodiment of the present disclosure.

An embodiment of the present disclosure provides a second touch substrate, which may be a self capacitance touch substrate, for example. For brevity, the following description will focus on the differences between the embodiment of FIG. 3 and the embodiments of FIGS. 2a and 2b, while omitting the similarities of the embodiment of FIG. 3 with the embodiments of FIGS. 2a and 2b. As shown in FIG. 3, each touch structure 1021 of each touch unit 102 in the touch region TCR of the touch substrate includes a touch electrode 1020. Each touch unit 102 in the fingerprint recognition region FRR of the touch substrate may include a plurality of (e.g., nine) fingerprint recognition structures 1031, and each of the fingerprint recognition structures 1031 includes a fingerprint recognition electrode 1030. For example, the touch electrodes 1020 and the fingerprint recognition electrodes 1030 are disposed in a same layer and made of a same material. For example, a configuration and a shape of each fingerprint recognition electrode 1030 may be the same as a configuration and a shape of each touch electrode 1020, respectively, except that the overall size (e.g., area) of each fingerprint recognition electrode 1030 is smaller than the overall size (e.g., area) of each touch electrode 1020. For example, in the example of FIG. 3, the overall size of each fingerprint recognition electrode 1030 may be ⅑ of the overall size of each touch electrode 1020. Therefore, the design difficulty and the manufacturing difficulty for the touch substrate are reduced.

It should be noted that, each touch structure 1021 of the touch substrate provided by the present embodiment of the present disclosure may be implemented by a self capacitance structure. The touch electrodes 1020 of the touch structures 1021 and the fingerprint recognition electrodes 1030 of the fingerprint recognition structures 1031 may be disposed in a same layer and made of a same material, such that the thickness of the touch substrate may be reduced. In the touch substrate shown in FIG. 3, the touch structures 1021 in the touch region TCR may implement the touch function, and the fingerprint recognition structures 1031 in the fingerprint recognition region FRR may implement both the touch function and the fingerprint recognition function. In the fingerprint recognition mode, a fingerprint recognition driving signal may be input to each fingerprint recognition electrode 1030 in the fingerprint recognition region FRR, and a change in capacitance between each fingerprint recognition electrode 1030 and valleys/ridges of a fingerprint of a finger is detected. Next, a current fingerprint image is formed through a preset algorithm (e.g., a known fingerprint recognition algorithm) according to the change in capacitance between each fingerprint recognition electrode 1030 and valleys/ridges of the fingerprint of a finger, and the current fingerprint image is compared with a preset fingerprint image (e.g., a reference fingerprint image) in a database, thereby implementing the fingerprint recognition function. In the touch mode, a same touch driving signal is input to the fingerprint recognition electrodes 1030 of each touch unit 102 in the fingerprint recognition region FRR, and at this time, the fingerprint recognition electrodes 1030 of each touch unit 102 are equivalent to one touch electrode 1020. A change in capacitance between the fingerprint recognition electrodes 1030 of the touch unit 102 and a finger is read, and a position where touch occurs may be determined according to the change in capacitance between the fingerprint recognition electrodes 1030 and the finger, thereby realizing the touch function.

As shown in FIG. 3, the touch electrodes 1020 are arranged in an array, and the fingerprint recognition electrodes 1030 are arranged in an array. The touch electrodes 1020 in a same row are connected to a same first driving line 201, and the touch electrodes 1020 in a same column are connected to a same sensing line 202. The fingerprint recognition electrodes 1030 in a same row are connected to a same second driving line 301, and the fingerprint recognition electrodes 1030 in a same column are connected to a same read line 302.

It should be noted that, for the fingerprint recognition region FRR, in the fingerprint recognition mode, a fingerprint recognition driving signal is input to the second driving line 301 connected to the fingerprint recognition electrodes 1030 in a same row, and the change in capacitance between the fingerprint recognition electrodes 1030 and the valleys/ridges of the fingerprint of a finger is read out through the read line 302 connected to the fingerprint recognition electrodes 1030, Next, a current fingerprint image is formed through a preset algorithm (e.g., a known image recognition algorithm) according to the change in capacitance between the fingerprint recognition electrodes 1030 and the valleys/ridges of the fingerprint of a finger, and then the current fingerprint image is compared with a preset fingerprint image (i.e., a reference fingerprint image) in a database, thereby implementing the fingerprint recognition function. For the fingerprint recognition region FRR, in the touch mode, a same touch driving signal is input to multiple second driving lines 301 connected to the fingerprint recognition electrodes 1030 in multiple rows, and since the touch driving signal input to the multiple second driving lines 301 in the multiple rows is the same, the fingerprint recognition electrodes 1030 of each touch unit 102 are equivalent to one touch electrode 1020 at this time. A change in capacitance between the fingerprint recognition electrodes 1030 and a finger is detected through multiple read lines connected to the fingerprint recognition electrodes 1030 in multiple columns, and a position where touch occurs may be determined according to the change in capacitance between the fingerprint recognition electrodes 1030 and the finger, thereby implementing the touch function. As described above, the touch electrodes 1020 are arranged in an array, and the fingerprint recognition electrodes 1030 are arranged in an array, which may reduce the wiring difficulty of the touch substrate.

As described above, each touch structure 1021 and each fingerprint recognition structure 1031 of the touch substrate provided by any one of the foregoing embodiments of the present disclosure may be implemented by a mutual capacitance structure (as shown in FIGS. 2a and 2b), or by a self capacitance structure (as shown in FIG. 3), such that flexibility of product design may be improved, and a capacitance structure for each touch structure 1021 and each fingerprint recognition structure 1031 may be selected according to actual requirements.

In an embodiment, the touch substrate further includes the driver. As described above, the driver may include a fingerprint recognition driving chip and a touch driving chip. For example, the fingerprint recognition driving chip may be connected to the fingerprint recognition units 103, and the touch driving chip may be connected to the touch units 102.

Further, the driver may further include a memory (e.g. a read only memory (ROM), a flash memory, etc.) for storing the preset fingerprint image (i.e. the reference fingerprint image), the current fingerprint image, other related data, related computer programs, and the like. It should be understood that for ease of illustration, the driver shown in FIGS. 2a and 3 includes two separate parts, but this is merely illustrative. For example, the fingerprint recognition driving chip, the touch driving chip and the memory of the driver may be integrated into a one-piece structure. For example, the touch driving chip may implement a point report function (e.g., reporting a horizontal ordinate and a vertical ordinate of a touch position to a Host that may be, for example, a central processing unit (CPU) or an application processor (AP) of a display device including the touch substrate) in a touch operation and other functions described herein. The fingerprint recognition driving chip may collect data of ridges and valleys of a fingerprint, convert the collected data into an appropriate form such as a fingerprint image, store the converted fingerprint image in the memory, compare the current fingerprint image with the preset fingerprint image (i.e., the reference fingerprint image) to determine whether the current fingerprint image is identical to the preset fingerprint image, and the like.

It should be noted that, the driver of the touch substrate is integrated with the fingerprint recognition driving chip and the touch driving chip for implementing the fingerprint recognition function and the touch function, thereby reducing the manufacturing cost of the driver.

In an embodiment, the substrate 101 of the touch substrate includes a flexible substrate.

It should be noted that the substrate 101 may be a flexible substrate, which facilitates the folding and deformation of the touch substrate, and may be applied to a flexible display device. A material of the flexible substrate may be polyimide (PI) or other flexible materials. Alternatively, the substrate 101 may be a non-flexible substrate (e.g., glass substrate), and the material of the substrate 101 may be selected according to the practical application.

An embodiment of the present disclosure provides a method for manufacturing the touch substrate, and the method may include the following steps.

In an initial stage of the structural design of the touch substrate, the touch region TCR and the fingerprint recognition region FRR on a surface (e.g., the upper surface in FIG. 1) of the substrate 101 are determined in advance such that the touch region TCR and the fingerprint recognition region FRR do not overlap with each other. The first bridges 1024 and the second bridges 1034 are formed in the touch control region TCR and the fingerprint recognition region FRR of the substrate 101, respectively, by a patterning process. Next, the interlayer insulating layer 1026 made of a transparent organic material or a transparent inorganic material is formed by coating or deposition. Then, the first electrodes 1022 and the second electrodes 1023 are formed in the touch region TCR and the third electrodes 1032 and the fourth electrodes 1033 are formed in the fingerprint recognition region FRR by a patterning process to form the touch units 102 and the fingerprint recognition units 103, and wirings (which include, for example, the driving lines 201 and 301, the sensing lines 202, the read lines 302, and the like) connected to the respective electrodes are formed simultaneously. Thereafter, the touch units 102 and the fingerprint recognition units 103 are connected to the touch driving chip and the fingerprint recognition driving chip of the driver, respectively, by using corresponding wirings and through a binding process, thereby forming the touch substrate with the touch function and the fingerprint recognition function, as shown in each of FIGS. 1 to 3.

It should be understood that, in each of the foregoing embodiments of the present disclosure, the pair of first electrodes 1022, the pair of second electrodes 1023, the first bridge 1024 and the first connector 1025 of each touch structure 1021, the pair of third electrodes 1032, the pair of fourth electrodes 1033, the second bridge 1034 and the second connector 1035 of each fingerprint recognition structure 1031, each touch electrode 1020, and each fingerprint recognition electrode 1030 may be made of indium tin oxide (ITO) or a transparent metal material to improve the light transmittance of these components. In this case, when the touch substrate and a display panel are combined to form a display device, these components of the touch substrate may overlap with pixels of the display panel in a stacking direction of the touch substrate and the display panel. Alternatively, at least a portion of the pair of first electrodes 1022, the pair of second electrodes 1023, the first bridge 1024 and the first connector 1025 of each touch structure 1021, the pair of third electrodes 1032, the pair of fourth electrodes 1033, the second bridge 1034 and the second connector 1035 of each fingerprint recognition structure 1031, each touch electrode 1020, and each fingerprint recognition electrode 1030 may be made of an opaque material (e.g., a metal mesh). In this case, when the touch substrate and a display panel are combined to form a display device, orthographic projections of these components of the touch substrate on the display panel may be located in gaps between adjacent pixels of the display panel, so as not to shield light emitted from the display panel.

Figure 4:
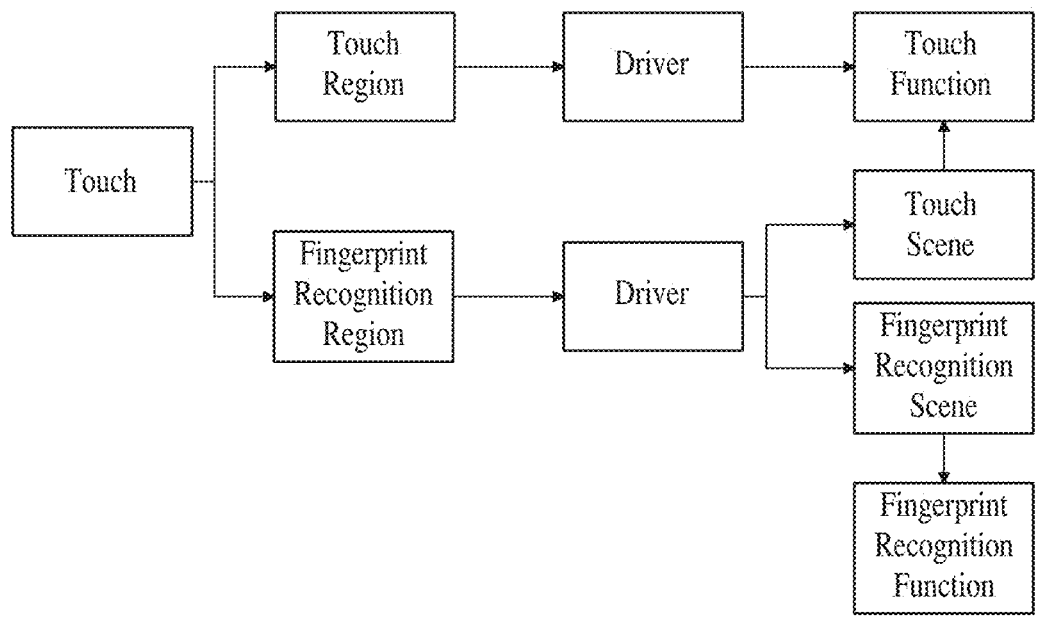
FIG. 4 is a schematic diagram illustrating an implementation principle of a touch substrate according to an embodiment of the present disclosure.

FIG. 4 is a schematic diagram illustrating an implementation principle of the touch substrate according to an embodiment of the present disclosure. As shown in FIG. 4, by default, the touch driving chip of the driver may directly output a touch driving signal to each touch unit 102 and each fingerprint recognition unit 103, such that each touch unit 102 and each fingerprint recognition unit 103 can detect a touch. Firstly, it is determined whether a touch occurs in the region of the touch units 102 (i.e., the touch region TCR) or a region of the fingerprint recognition units 103 (i.e., the fingerprint recognition region FRR). If a touch occurs in the region of the touch units 102, this region does not have the fingerprint recognition function, such that the touch driving chip of the driver may continuously output a touch driving signal to the corresponding touch units 102, and a change in capacitance in the touch units 102 is read out through the sensing lines 202 to determine a position where the touch occurs, thereby implementing the touch function. If a touch occurs in the region of the fingerprint recognition units 103, this region has not only the fingerprint recognition function but also the touch function, and the driver needs to determine the type of the touch according to an application scene (e.g., the application scene may also be determined by presenting a drop-down list box to the user to receive an input from the user). If the driver determines that the application scene is a fingerprint recognition scene, the fingerprint recognition driving chip of the driver may output a fingerprint recognition driving signal to the corresponding fingerprint recognition units 103 accordingly, reads a change in capacitance between the fingerprint recognition units 103 and the valleys/ridges of a fingerprint of a finger through the read lines 302, forms a current fingerprint image through a preset algorithm, and compares the current fingerprint image with the preset fingerprint image in a database, thereby implementing the fingerprint recognition function. If the driver determines that the application scene is a touch scene, the touch driving chip of the driver outputs a touch driving signal to the corresponding fingerprint recognition units 103, and a change in capacitance of the corresponding fingerprint recognition units 103 is read out through the sensing line 202 to determine a position where the touch occurs, thereby implementing the touch function.

Based on the same inventive concept, an embodiment of the present disclosure provides a display device including the touch substrate provided by any one of the foregoing embodiments. The display device may further include a display panel (e.g., a liquid crystal display (LCD) panel, an organic light emitting diode (OLED) display panel, or the like) for implementing a display function, and a central processing unit (CPU) or an application processor (AP) for controlling the touch substrate and the display panel. The display device may be an electronic paper, a smart phone, a tablet computer, or the like, and the implementation principle of the touch function and the fingerprint recognition function of the display device are the same as those of the touch substrate provided by any one of the foregoing embodiments, and will not be repeated here.

It should be understood that the above embodiments are merely exemplary embodiments for explaining the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. A touch substrate, comprising:
  a substrate having a surface comprising a touch region and a fingerprint recognition region, wherein the touch region and the fingerprint recognition region do not overlap with each other; and
  a plurality of touch units in the touch region and the fingerprint recognition region, respectively; wherein
  each of the touch units in the touch region comprises a touch structure;
  each of the touch units in the fingerprint recognition region comprises a plurality of fingerprint recognition units; and
  each of the plurality of fingerprint recognition units comprises a fingerprint recognition structure, and in a touch mode, each fingerprint recognition structure is multiplexed as a touch structure of each touch unit in the fingerprint recognition region,
  wherein a configuration and a shape of the fingerprint recognition structure are the same as a configuration and a shape of the touch structure in the touch region, and a size of the fingerprint recognition structure is smaller than a size of the touch structure in the touch region.

2. The touch substrate according to claim 1, wherein the touch structure in the touch region comprises: a pair of first electrodes, a pair of second electrodes, a first bridge, a first connector, and a first interlayer insulating layer; wherein
  the first electrodes in the pair are connected to each other by the first bridge, the second electrodes in the pair are connected to each other by the first connector, and the first bridge and the first connector are arranged to cross each other and are spaced apart from each other by the first interlayer insulating layer.

3. The touch substrate according to claim 2, wherein the fingerprint recognition structure comprises: a pair of third electrodes, a pair of fourth electrodes, a second bridge, a second connector, and a second interlayer insulating layer; wherein
  the third electrodes in the pair are connected to each other by the second bridge, the fourth electrodes in the pair are connected to each other by the second connector, and the second bridge and the second connector are arranged to cross each other and are spaced apart from each other by the second interlayer insulating layer.

4. The touch substrate according to claim 3, wherein
  the first electrodes, the second electrodes, the third electrodes, the fourth electrodes, the first connector, and the second connector are in a same layer and comprise a same material;
  the first bridge and the second bridge are in a same layer and comprise a same material; and
  the first interlayer insulating layer and the second interlayer insulating layer are in a same layer and comprise a same material.

5. The touch substrate according to claim 4, wherein touch structures of the touch units in the touch region are arranged in an array, fingerprint recognition structures of the touch units in the fingerprint recognition region are arranged in an array;
  the first electrodes of the touch structures in a same row are connected to a same first driving line, and the second electrodes of the touch structures in a same column are connected to a same sensing line; and
  the third electrodes of the fingerprint recognition structures in a same row are connected to a same second driving line, and the fourth electrodes of the fingerprint recognition structures in a same column are connected to a same read line.

6. The touch substrate according to claim 4, wherein two second electrodes of each touch structure and the first connector connecting the two second electrodes to each other are a one-piece structure.

7. The touch substrate according to claim 6, wherein two fourth electrodes of each fingerprint recognition structure and the second connector connecting the two fourth electrodes to each other are a one-piece structure.

8. The touch substrate according to claim 7, wherein touch structures of the touch units in the touch region are arranged in an array, and fingerprint recognition structures of the touch units in the fingerprint recognition region are arranged in an array; wherein
  adjacent first electrodes of adjacent touch structures in a same row are a one-piece structure;
  adjacent second electrodes of adjacent touch structures in a same column are a one-piece structure;
  adjacent third electrodes of adjacent fingerprint recognition structures in a same row are a one-piece structure; and
  adjacent fourth electrodes of adjacent fingerprint recognition structures in a same column are a one-piece structure.

9. The touch substrate according to claim 1, wherein the touch structure in the touch region comprises a touch electrode, the fingerprint recognition structure comprises a fingerprint recognition electrode, and the touch electrode in the touch region and the fingerprint recognition electrode in the fingerprint recognition region are in a same layer and comprise a same material.

10. The touch substrate according to claim 9, wherein touch electrodes are arranged in an array, and fingerprint recognition electrodes are arranged in an array;

the touch electrodes in a same row are connected to a same first driving line, and the touch electrodes in a same column are connected to a same sensing line; and the fingerprint recognition electrodes in a same row are connected to a same second driving line, and the fingerprint recognition electrodes in a same column are connected to a same read line.

11. The touch substrate according to claim 1, further comprising a driver comprising a fingerprint recognition driving chip and a touch driving chip; wherein the fingerprint recognition driving chip is connected to the plurality of fingerprint recognition units so as to control the plurality of fingerprint recognition units to implement a touch function and a fingerprint recognition function; and the touch driving chip is connected to the touch units in the touch region to control the touch units in the touch region to implement the touch function.

12. The touch substrate according to claim 1, wherein the substrate is a flexible substrate.

13. The touch substrate according to claim 1, wherein the touch region and the fingerprint recognition region are at two ends of the surface of the substrate, respectively.

14. The touch substrate according to claim 1, wherein the fingerprint recognition region divides the touch region into two separate parts, or the touch region surrounds the fingerprint recognition region.

15. A display device, comprising the touch substrate according to claim 1.

16. The display device according to claim 15, further comprising a display panel.

17. The display device according to claim 16, wherein the display panel is an organic light emitting diode (OLED) display panel.

18. The display device according to claim 16, wherein at least one of the fingerprint recognition structure and the touch structure of the touch substrate overlaps with a pixel of the display panel in a stacking direction of the touch substrate and the display panel.

19. The display device according to claim 16, wherein an orthographic projection of at least one of the fingerprint recognition structure and the touch structure of the touch substrate on the display panel is in a gap between adjacent pixels of the display panel.

* * * * *